(12) United States Patent
Oleynikov et al.

(10) Patent No.: US 10,122,720 B2
(45) Date of Patent: Nov. 6, 2018

(54) SYSTEM AND METHOD FOR AUTOMATED WEB SITE CONTENT ANALYSIS

(71) Applicant: Parallels International GmbH, Schaffhausen (CH)

(72) Inventors: Sergey Oleynikov, Novosibirsk (RU); Yury Zagorulko, Novosibirsk (RU); Elena Sidorova, Novosibirsk (RU)

(73) Assignee: Plesk International GmbH, Schaffahusen (CH)

( * ) Notice: Subject to any disclaimer, the term of this patent is extended or adjusted under 35 U.S.C. 154(b) by 167 days.

(21) Appl. No.: 15/426,763

(22) Filed: Feb. 7, 2017

(65) Prior Publication Data

US 2018/0225275 A1 Aug. 9, 2018

(51) Int. Cl.
*G06F 17/27* (2006.01)
*H04L 29/06* (2006.01)
*G06K 9/00* (2006.01)
*G06F 17/30* (2006.01)

(52) U.S. Cl.
CPC .......... *H04L 63/10* (2013.01); *G06F 17/2765* (2013.01); *G06F 17/2785* (2013.01); *G06F 17/30684* (2013.01); *G06F 17/30896* (2013.01); *G06K 9/00456* (2013.01)

(58) Field of Classification Search
None
See application file for complete search history.

(56) References Cited

U.S. PATENT DOCUMENTS

| | | | |
|---|---|---|---|
| 8,683,031 B2* | 3/2014 | Green | G06F 17/30864 709/224 |
| 8,965,888 B2* | 2/2015 | Miyaki | G06F 21/6218 707/732 |
| 2016/0134647 A1* | 5/2016 | Allen | H04L 63/1416 726/23 |
| 2016/0134649 A1* | 5/2016 | Allen | H04L 63/1416 726/23 |
| 2017/0111328 A1* | 4/2017 | Leon | H04L 9/14 |
| 2017/0344743 A1* | 11/2017 | Shi | H04L 63/0245 |
| 2018/0191777 A1* | 7/2018 | Volkov | H04L 63/1483 |

* cited by examiner

*Primary Examiner* — Satwant Singh
(74) *Attorney, Agent, or Firm* — Bardmesser Law Group

(57) ABSTRACT

A system and method for an automated web source content analysis. The system of automated content analysis performs the following: a search of terms, i.e. key words and phrases, presented in the special dictionary, in the text content; executes a multi-factor genre content analysis based on structural, pragmatic and stylistics properties; executes thematic content analysis using a rubricator built based on illegal subjects and topics and their antagonists; and the system makes a decision based on a combination of thematic and genre properties of the text. The proposed method allows for providing a final decision in terms that are easily understood by a user.

17 Claims, 3 Drawing Sheets

SYSTEM AND METHOD FOR AUTOMATED WEB SITE CONTENT ANALYSIS

BACKGROUND OF THE INVENTION

Field of the Invention

This invention relates to a method for web site content analysis, and in particular, for automated identification of web sites or web pages containing prohibited content.

Description of the Related Art

A modern trend for hosting web sites with large amounts of web content presents some problems with regard to identification and blocking of the prohibited or harmful content. Conventionally, this can be implemented manually by a hosting administrator. These manual analyses are labor intensive and take up a long time, and are often ineffective based on the following reasons. The manual content analysis is slow compared to site update rates. In other words, the sites can be updated faster than they can be analyzed by the administrator or even a small group of experts or administrators.

The administrator cannot process multiple linguistic connections (i.e., parallelisms) that require a large number of factors to be considered for effective content analysis. Also, it is often not possible to view and analyze long chains (trees) of connected texts by a person. Furthermore, only using key words (i.e., bad or forbidden words) for filtering the content does not produce sufficient results, because detection of the key word does not necessarily suggest good or bad use. For example, word "cocaine" may be used in the web page promoting sales, or discussing bad consequences of the use of this substance, addictions, etc. An automated web page content analysis can improve blocking of websites, which is not limited by cognitive limitations of a human expert or a group of experts.

Accordingly, an efficient method for an automated analysis of web page content is desired.

SUMMARY OF THE INVENTION

Accordingly, the present invention is directed to a method for an automated content analysis that substantially obviates one or more of the disadvantages of the related art.

In one embodiment, a system for an automated web source content analysis is provided. The system of automated content analysis performs the following:

1. A search of terms (key words and phrases) in the text of document. The terms are provided by a dictionary created by experts;
2. Executes a multi-factor genre content analysis based on structural, pragmatic and stylistics properties. The genre can determine an activity (or a purpose) performed by a given web resource (e.g., message board, online shop, information site, website of the organization, personal website, a blog, etc.);
3. Implements thematic content analysis using a thematic rubricator. According to the exemplary embodiment, a thematic rubricator is a hierarchical structure built based on illegal subjects and topics and their antagonists; and
4. The system makes a decision based on a combination of thematic and genre properties of the text.

According to an exemplary embodiment, the system can replicate a human thought process not only at the level of key words, but also at the thematic and pragmatic levels. The proposed method allows for providing a final decision in terms that are easily understood by a user. The automated detection method, unlike a human expert, can detect difference between propaganda vs. information, encyclopedia-like descriptions of a substance vs. production or growing instructions. The automated system indicates a high level of suspicion in borderline cases.

According to the exemplary embodiment, two methods are used. The first method is based on mathematical calculation of probability of belonging of the text content to a certain genre. The second method is rule-based. The content genre is determined based on certain probability or relevance. This means that for the text content its correspondence to each genre given in the genre rubricator is calculated.

In another embodiment, a system for automated analysis of web source content, is provided. The system includes, for web page documents of a website, computer program code executing on a processor for defining text fragments and their types based on content marking by content tags; deriving terms from a dictionary; finding the terms within the text fragments; determining a suspiciousness parameter value of the text by counting a number of terms with a lexical property "suspicious" in the text fragment, wherein the suspiciousness parameter is "true" if a predetermined number of terms with the "suspicious" lexical property is found in the text; defining thematic properties of the text of the web page document based on the thematic characteristics of terms found in the text; saving genre and thematic properties of the text in a document index; assigning a "suspicious" status to any "child" web page documents; repeating analysis of the text of the web page document if the "suspicious" status is changed. The system also includes computer program code for determining a genre of the web site based on the genres of the web page documents; saving the genre of the website into a site index; calculating a document disallowance parameter based on rules for all of the web site documents with the "suspicious" status and saving the disallowance parameters into the web site document index; assigning a "disallowed" status to the web page documents if its disallowance parameter exceeds a threshold; saving the "disallowed" status of the web page documents into a web page index; finding a document with a maximum value of the disallowance parameter in the web site index and saving the disallowance parameter as a site disallowance parameter; assigning the "disallowed" status to the web site if its disallowance parameter exceeds a threshold; and blocking the web site based on the "disallowed" status of the web site. The rules include the thematic properties of the texts of the web page documents, genre properties of the web page documents and a genre property of the web site. The computer code may be a means for implementing the described functions.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
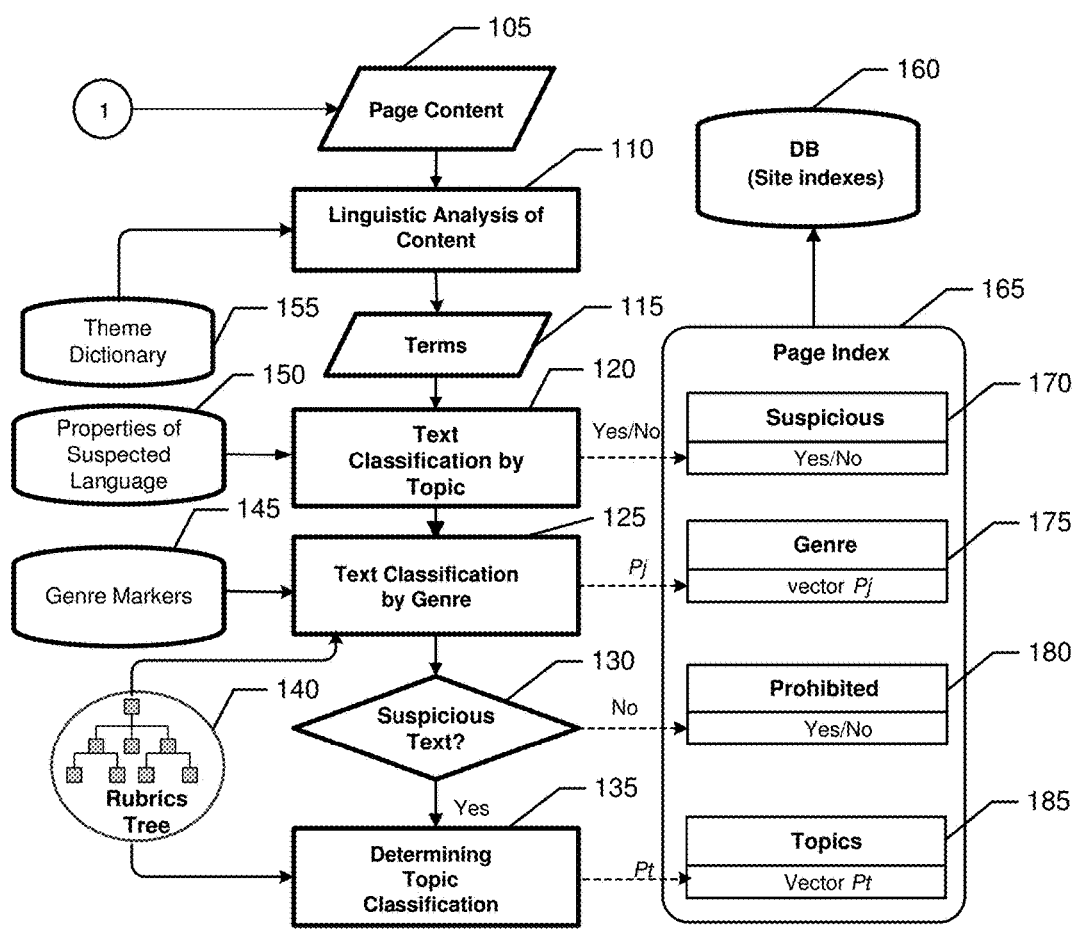
FIG. 1 illustrates a flow chart for automated processing of one text page, in accordance with the exemplary embodiment.

Reference will now be made in detail to the preferred embodiments of the present invention, examples of which are illustrated in the accompanying drawings.

The present invention is directed to a method for automated web site content analysis used by web hosting providers.

The following definitions are used:

A document is an arbitrary text or structured text with objects, which can include HTML/XML markings and graphical objects within it. A web site consists of a set of documents (e.g., texts, articles, blog entries, forum posts, pictures, etc.)

A term is a word or a phrase, which can be found in the text of the document.

A term attribute is a weight property, which defines a degree of relevancy of the term to a certain theme and genre of the document. The weight is defined by (0,1) values or by a binary property assigning a lexical property to the term.

A theme (topic) is an element of a hierarchical thematic rubricator. The theme reflects a meaning of the document content with regards to the theme used for content filtering system. A thematic rubricator can include forbidden as well as allowed themes. In plainer English, a theme (topic) is a general subject of the document, usually expressed as a human-readable string, e.g., in the context of narcotics/drugs, topics can be "narcotics", with sub-topics "narcotics/drug use", "narcotics/drug sales/distribution", "narcotics/drug smuggling or transportation", "narcotics/drug propaganda," and so on. Topics are organized into a hierarchical thematic (topical) rubricator.

A genre is an element of a genre rubricator. The genre reflects pragmatic properties of a document and of an entire site. Pragmatic properties define an activity performed by a web resource and a communication method used for performing the activity. Examples of a genre are a blog, a scientific article, a commentary, a news article, a post on a forum, etc. Essentially, genres describe the type of publication, and are used together with the notion that some genres (such as blogs or commentary) are more likely to be related to forbidden content than others (such as scientific articles).

A lexical property (or lexical characteristic) is a stylistic or semantic property of a term received from external sources (e.g., a slang dictionary, a list of forbidden substances (e.g., "coke", "smack"), a list of drugs not normally available to the public without a prescription, particularly drugs with a narcotic component in them, list of terms relating manufacturing or transport or smuggling of narcotics or precursors of narcotics, list of terms relating to terrorism or explosives or precursors of explosives, special industry terms (professional terms), social group terms, obscene language, etc.). Typically, there can be hundreds of such terms, and many groups of terms, relating to various activities that are illegal (or at least in some sense socially undesirable)—as well as many groups of terms that are not, inherently, undesirable (e.g., medical terms, or professional terms). A typical term has many lexical characteristics, which may be thought of as a vector of dimension P, where P is the number of different groups of terms known to the system, and where each value of the vector is a boolean True/False, corresponding to whether the term belongs to the particular group (i.e., to the group of terms "list of forbidden substances", group of terms "professional terms"), etc. Belonging to a particular group of terms is not, by itself, suspicious or indicating forbidden content (for example, a term like "overdose" could belong to a group of medical terms, but does not itself indicate that the subject matter of the text in which it is found relates to narcotics; other terms maybe suspicious because they can appear in both forbidden and allowed content—for example "coke" can refer to a drink, or it can refer to cocaine—this illustrates that deciding on suspicious of the whole text is usually impossible based on a single term, even if that term ("coke") might be classified as belonging to a group of terms "narcotics/drug use"). One of the groups is "suspicious terms", usually defined by an expert or an admin, containing terms thought to be suspicious (i.e., possibly relating to content that should be blocked). It should be apparent that there is overlap between many groups of terms.

A dictionary is a set of terms. Each term in the dictionary has its attributes and additional data required for finding the term in the text (e.g., morphological forms of a word).

A document index is a database structure reflecting document properties and including a document ID, thematic and genre properties of its text content as well as suspiciousness and disallowance parameters.

A document suspiciousness parameter is a Boolean value reflecting relevance of the text to the general theme, which determines its allowability (e.g., "Drug use").

A document disallowance parameter is a percentage value reflecting a degree of a disallowed content in the document.

A thematic property of the text is a value vector reflecting a distribution of relevancy of the text to the topics defined in the thematic rubricator. In other words, with M topics, such a vector has a dimension of M, and each value of the vector reflects how close the text is to the topic (for example, in percentage terms—100% would mean that the text is entirely about topic X, and 0% means it is entirely unrelated to topic X).

A genre property of the text is a value vector reflecting a distribution of relevancy of the text to the genres defined in the genre rubricator.

A genre property of a site is a value vector reflecting a distribution of relevancy of the site to site genres defined by the genre rubricator.

A site index is a database structure reflecting document properties including a site identifier, indexes of site documents, site structure, genre properties of the site and a disallowance parameter of the site.

A site structure is a list of site documents and links between them defined by hyperlinks or by metadata received from a hosting platform (e.g., Plesk™).

A site disallowance parameter is a percentage value from a maximum disallowance parameter of the site document;

A rule is a filtering formula for calculation of the correspondence of the text to a combination of thematic properties, genre properties and lexical properties defined by the formula. The rule is used for defining the text as "allowed" or "disallowed" content.

A document suspiciousness status is a status assigned to a document if its suspiciousness parameter is determined to be positive (or sufficiently high, e.g., 50%).

A "disallowed" status is the status assigned to a document or to a site, if its disallowance parameter exceeds a threshold value set by the administrator.

According to an exemplary embodiment, the system of automated content analysis performs the following:

1. Performs a search of terms (key words and phrases), presented in the dictionary, in the text of a document (a dictionary is created by experts in the field). Only an expert in the particular field can perform such search manually. For example, detection of an illegal content related to drugs requires an expert (e.g., a pharmacist), since the dictionary contains a list of illegal substances, synonyms, Latin equivalents, slang references, etc.

2. Executes a multi-factor genre content analysis based on structural, pragmatic and stylistics properties. The genre can determine an activity performed by a given web resource (e.g., sales, promotions, production instructions, prevention methods, current news, health issues, medications, etc.). The analysis can be based on genre markers (within one text) and on connections between the texts within one web resource. Such analysis cannot be performed manually even by experts, because the analysis requires looking at large amounts of interconnected contents that depend on each other based on a chain or a tree structure.

3. Performs thematic content analysis using a thematic rubricator.

According to the exemplary embodiment, a thematic rubricator is built based on illegal subjects and prohibited topics and their antagonists (propaganda vs. anti-propaganda, selling illegal drugs vs. selling legal medications) detected during analysis of websites a priori known to contain (or not to contain) specific topics. The thematic analysis is implemented using machine classification methods employing preliminary machine learning. The machine learning is done based on a training set of web page documents that are known to contain specific suspicious or forbidden content.

4. The system makes a decision based on a combination of thematic, lexical and genre properties of the text. An expert creates a set of rules for allowing or prohibiting combinations of topics and genres. The rules are very simple and can be easily understood by a user. An example of a rule would be <If topic="Sale" and text genre="Offer of goods" and lexical property="Slang of addicts" then text type="disallowed">, or <If topic="Properties of Prohibited Substances" and text genre="Message board" and site genre="Information site" then text type="disallowed">, or <If topic="Narcotic effects" and text genre="Scientific article" and site genre="Site of a government organization" then text type="allowed">

According to the exemplary embodiment, the system can replicate a human thought process not only at the level of key words, but also at the thematic and pragmatic levels. This approach is more efficient compared to the conventional ones that solely rely on machine learning or on a primitive search-based key words and formal properties (i.e., text length, number of letters or symbols, number of links, etc.). The proposed method allows for providing a final decision in terms that are easily understood by a user. The automated detection method, unlike a human expert, can always detect a difference between propaganda vs. information, encyclopedia-like descriptions of an illegal substance vs. production or growing instructions. The automated system indicates a high level of suspicion in borderline cases. (e.g., topics that are close to each other in terms of textual content in some sense, but actually having opposite meaning—such as propaganda of use of narcotics vs. anti-propaganda.)

According to the exemplary embodiment, two methods are used. The first method is based mathematical calculation of probability of belonging of the text content to a certain genre. The second method is rule-based. The genre of the text content is determined based on certain probability or relevance. This means that for the text content its correspondence to each genre given in the genre rubricator is calculated. The determination is performed in two stages:

1. Determination of the text genre. The rules are applied. If no one rule could not be applied, a statistical method is used. A vector of relevancy of the text to the genre is formed while the text genre is analyzed:

$\overline{P}_j = p(j_1), \ldots, p(j_{Nt})$, where Nj—a number of all genres in the genre rubricator, $p(j_k)$—a probability of implementation of the genre $j_k$ in the text, i=1, . . . , Nj; $\Sigma_{k=1}^{Nj} p(j_k)=1$.

According to the exemplary embodiment, the genres can be determined based on rules or templates. The text genre can be determined based on genre templates of web-pages (documents) developed by experts. The text genre is defined by a set of alternatives, where each alternative defines coincidental occurrence of genre markers within a set of structural fragments indicating where the markers can be found. The text genre is described as follows:

gid: [<marker$_{11}$, fr$_{11}$><marker$_{12}$, fr$_{12}$> . . . ] . . . [<marker$_{m1}$, fr$_{m1}$><marker$_{m2}$, fr$_{m2}$> . . . ]

where gid—is unique identifier of genre of web text;

marker$_{ij}$—a marker described in a set of genre markers created by experts; fr$_{ij}$—a type of a structural fragment for a corresponding marker (e.g., page or block title, sub-title, link, etc.).

The resulting vector includes values of relevancy of analyzed text (probability of belonging of the analyzed text) to genres that have been determined. Each genre is determined with a probability 1/n, where n is an aggregated number of the determined genres.

According to one exemplary embodiment, a genre classification is performed based on machine learning. Relevancy (i.e. a probability of implementation of a genre $j_k$) is calculated as:

$$p(j_k) = \sum_{\langle l_i, j_k \rangle} \alpha_{fi} \cdot w(l_i, j_k),$$

where:

$l_i$ is a term found in the text and $\langle l_i, j_k \rangle$ is connection of the term $l_i$ with genre $j_k$ given in the dictionary;

$w(l_i, j_k)$ is a weight of the connection $l_i$ with genre $j_k$ in the dictionary;

$\alpha_{fi}$ is a weight of structural text fragment, where the term $l_i$ is found.

2. Determination of the site genre. The site genre is determined based on text genres of all its documents. The site genre is described as follows:

"Name_of_Site_Genre": [genre$_{11}$, genre$_{12}$, . . . ] [genre$_{21}$, genre$_{22}$, . . . ] . . . , Where square brackets contain the alternatives consisting of sets of document genres (genre$_{ij}$). Then, the site genre can be determined based on the coincidental occurrences of documents which have genres included within the same alternative. During the site analysis, for each site genre the variables genre_val$_{ij}$ are filled with values equal to maximum relevancy of genre$_{ij}$ among pages of this site. Then, the relevancy of each site genre is calculated as:

$$p(js) = \max_i \left( \sum_j \frac{n_i}{\frac{1}{genre\_val_{ij}}} \right),$$

where $n_i$—a number of document genres in i-th alternative.

Thus, the resulting vector of distribution of relevancies of site genres is:

$\overline{P}_{js}=(p(js_1), \ldots, p(js_{Nj}))$, where Nj is a number of all site genres in a genre rubricator, $p(js_k)$ is a probability of implementation of genre $js_k$ on the web site, i=1, . . . , Nj;

$$\sum_{k=1}^{Nj} p(js_k) = 1.$$

According to one exemplary embodiment, selection of the most suitable text genre or site genre is not performed. Instead, the vectors of distribution of relevancies are used for decision making. Note that the exemplary embodiment allows for multi-parameter genre-thematic analysis and classification.

According to the exemplary embodiment, use of a thematic rubricator configured for text content filtration allows for improving the recall and the precision of the content analysis as compared to binary classification where the content is classified into two classes—prohibited and allowed. Use of term weights calculated based on a proprietary formula and included within the dictionaries allows to improve the quality of content analysis. The method using genre markers reflecting aspects such as main text content of a page and text content of the tags. The set of the genre markers is manually constructed based on a training set and contains words, combination of words, template phrases, language-based cliché s typical for certain positions in resource structure (e.g., page or block title, sub-title, link, etc.).

According to the exemplary embodiment, the identified genre can accurately reflect the web resource activity, its goals and a target audience, media properties of resources and linguistic-related stylistics used.

According to one embodiment, properties of genre-thematic classification are grouped in such a way that each group reflects a certain aspect of the classification: thematic, genre, structural, pragmatic, media and lexical-stylistic. A genre-structural classification based on a two-level model uses:
  a macro-level (the entire resource); and
  a micro-level (resource components: document, sub-section and block).

A genre-pragmatic classification of the resources (based on pragmatic aspects of content and its presentation);
  activity aspects (type of activity performed by the resource—e.g., sales, healthcare, etc.); and
  content and its presentation aspects tied to a communication channel (media properties of the resource—e.g., comments or forum posts).

A genre-stylistic resource classification:
  lexical-stylistic aspects of the content and its presentation (stylistic properties of the used language (e.g., English, French, Russian, etc.) with emphasis on stylistic features such as slang, professional terms, social group terms or inappropriate or obscene language).

The information (knowledge) about document and site genres is extracted from training set of web sites, which is selected by experts. The content analysis is based primarily on pragmatic aspects of the processed (analyzed) resource. Thus, it does not matter whether the text of the content is a fiction or another type. The actual type of the text does not allow for making a decision as far as the content being negative (i.e., subject to be blocked) or positive. The decision is made based on a combination of genre, thematic and stylistic parameters. The algorithm, in accordance with the exemplary embodiment, can be taught for dealing with the fictional texts. The decision to block the content is made based on the following parameters:

1. Vector of relevancy of the text content to all topics from a thematic rubricator:

$\overline{P}_t=(p(t_1), p(t_2), \ldots, p(t_i), \ldots, p(t_{Nt}))$, wherein

Nt—a number of all subjects (topics) of the rubricator,
   $p(t_i)$—probability of implementation of the topic $t_i$ in the analyzed text, i=1, . . . , Nt;

$$\sum_{i=1}^{Nt} p(t_i) = 1.$$

2. Vector of relevancy of the text content to genres of documents from a genre rubricator:

$\overline{P}_j=(p(j_1), \ldots, p(j_{Nj}))$, wherein

Nj—a number of all genres of documents of the rubricator,
   $p(j_i)$—probability of implementation of the genre $j_i$ in the analyzed text, i=1, . . . , Nj;

$$\sum_{i=1}^{Nj} p(j_i) = 1.$$

3. Vector of relevancy of the entire site content to genres of sites from a genre rubricator:

$\overline{P}_{js}=(p(js_1), \ldots, p(js_{Njs}))$, wherein

Njs—a number of all genres of site in the genre rubricator,
   $p(js_i)$—probability of implementation of the genre $js_i$ in the analyzed site, i=1, . . . , Njs;

$$\sum_{i=1}^{Njs} p(js_i) = 1.$$

4. Presence of certain lexical characteristics of terms found in the text (e.g., professional terms, slang, obscene language, etc.).

Let $L_n$ be a set of lexical properties given in a dictionary. Then, a vector of lexical properties values of the text is:
  $VL=(v(lex_1), \ldots v(lex_{Ln}))$, where $v(lex_i) \in \{0,1\}$—a value of a lexical property $lex_i$, $v(lex_i)=1$, if a term with the lexical property $lex_i$ is present in the text.

A probability of coincident implementation of the topic and the genres on the web site is calculated as a product of probabilities: $p(t_i)p(j_k)p(js_m)$.

Vector of relevancy of the coincident implementation of topics, genres and lexical characteristic is generated as:

$$\overline{P}_{Rule} = (p(t_1)p(j_1)p(js_1)v(lex_1), \ldots, p(t_i)p(j_k)p(js_m)v(lex_q), \ldots)$$

This vector reflects a combination of probabilities of coincident implementation of a topic, text genre, site genre and lexical characteristic (combination topic×_text genre_× site genre×_lexical characteristic).

According to the exemplary embodiment, a set of rules that for each occurrence of a coincident implementation of a topic $t_i$, a genre $j_k$, a site genre $js_m$ and a lexical characteristic $lex_q$ assign a disallowing marker $m^-$ or allowing marker $m^+$ is produced by experts or using an automatic rule generation method $$f: \overline{P}_t \times \overline{P}_j \times \overline{P}_{js} \times V_L \rightarrow \{m^-, m^+\}$$

The above function $f$ reflects a combination of text properties marked as $m^-$ or $m^+$ according to the rules.

In order to arrive to a final content allowance or disallowance decision, a relevancy vector $\overline{P}_{Rule}$ is converted into a two-component vector:

$$\overline{M}, \overline{M} = (M^-, M^+), F: \overline{P}_{Rule} \rightarrow \overline{M}$$

Accordingly, the components of the vector $\overline{M}$ are determined as:

$$M^- = \Sigma_{f(r_j)=m^-} r_j, M^+ = \Sigma_{f(r_j)=m^+} r_j, \text{ such that } r_j = p(t_i) \cdot p(j_k) \cdot p(js_m) \cdot lex_q.$$

Then, a final decision about blocking or allowing the content is made based on C criterion. If $C=(M^- - M^+)>0$, the content is disallowed (i.e., subject to be blocked). This criterion can be adjusted in order to increase either blocking power or precision of the filtration.

According to the exemplary embodiment, the two-component vector of positive and negative estimations of probabilities of combinations topic×genre×site genre×lexical characteristic of a term can be generated.

According to one exemplary embodiment, an algorithm for automated analysis of document content is implemented. The proposed algorithm uses the following input objects:
 a dictionary;
 a thematic rubricator;
 a genre rubricator;
 a set of genre markers;
 a set of genre templates of web-pages (documents); and
 a document.

The algorithm outputs a document index. The algorithm for automated analysis of document content includes the following steps:
 1. Structural analysis of a document, defining text fragments and their types based on marking of the content by content tags (e.g., html, xml and etc.).
 2. Lexical analysis of the text of the document:
  a. Finding the terms within the text provided by the dictionary; and
  b. Counting a number of occurrences of each term in the text.
 3. Determination of a suspiciousness parameter value by:
  a. Counting a number of terms with a lexical property "suspicious" in the text;
  b. Calculating and saving the suspiciousness parameter value into the document index. The suspiciousness parameter has a "true" value, if at least one term with a "suspicious" lexical property is found in the text.
 4. Calculation of a text genre properties by:
  a. Searching for genre markers among terms found in the text;
  b. Calculation of genre based on the genre markers detected in the text fragments (from step 1);
  c. Genre classification of the text (if the genre is not determined in step b) based on genre properties of the terms found in the text; and
  d. Saving genre properties of the text in the document index.
 5. Calculation of thematic properties of the text (if the suspiciousness parameter is true) by:
  a. Thematic classification of the text based on thematic properties of the terms found in the text; and
  b. Saving thematic properties of the text in the document index.

According to the exemplary embodiment, disallowance parameter of the document index is calculated after the site genre is analyzed. According to another exemplary embodiment, an algorithm for automated analysis of the site content is implemented.

According to the exemplary embodiment, the proposed algorithm for automated analysis of the site content uses the following input objects:
 a site;
 a site genre rubricator;
 a set of genre templates of sites; and
 a base rules (i.e., filtration formulas).

The algorithm outputs the following:
 1. A "disallowed" status of site documents;
 2. A "disallowed" status of the site; and
 3. A site index.

The algorithm for automated analysis of the site content includes the following steps:
 1. Analyzing of the content of new and updated site documents and generating document indexes;
 2. Structural analysis of the site by:
  a. Finding "child" documents linked to the document with the "suspicious" status and assigning the same status to the "child" documents; and
  b. Repeating analysis of documents' contents that have a change in their suspiciousness status.
 3. Calculating a genre property of the site by:
  a. Analyzing a site genre based on the genres of the site documents; and
  b. Saving the site genre property into a site index.
 4. Calculating a "disallowed" parameter for all documents having a suspicious status. For each of these documents:
  a. Calculating a document disallowance parameter based on the filtration formulas and saving the parameter into the document index; and
  b. Assigning the "disallowed" status to the document if its disallowance parameter exceeds the threshold.
 4. Calculating a disallowance parameter of a site by:
  a. Finding a document with a maximum value of the disallowance parameter in the site index and saving the disallowance parameter as a site disallowance parameter; and
  b. Assigning the "disallowed" status to the site if its disallowance parameter exceeds the threshold.

FIG. 1 illustrates a flow chart for an automated processing of one text document, in accordance with the exemplary embodiment. In step 105, a document content to be analyzed is received into an analyzer module. (Typically, these modules are executing on the infrastructure of a hosting provider.) Linguistic analysis of the content is performed in step 110 based on a dictionary 155. It results in a set of terms of dictionary 115 found in the text. Suspiciousness of text is determined in step 120 using the "suspicious" lexical property of terms 150. A suspicious (yes/no) indicator 170 is set in document index 165. Text classification by genre is implemented in step 125 using a text genre rubricator 140 and genre markers 145. A vector of relevancy of the text content to the genres of the text from the text genre rubricator is generated and a genre of the text content 175 is set in the document index 165, which is then saved into a site indexes database 160.

If the text is deemed to be suspicious in step 130, the topic classification is performed in step 135. Otherwise, a prohibited (yes/no) marker 180 is set in the document index 165. In step 135, a vector of relevancy of the text content to the text thematics from the thematic rubricator is generated and a topic of the text content 185 is set in the document index 165.

Figure 2:
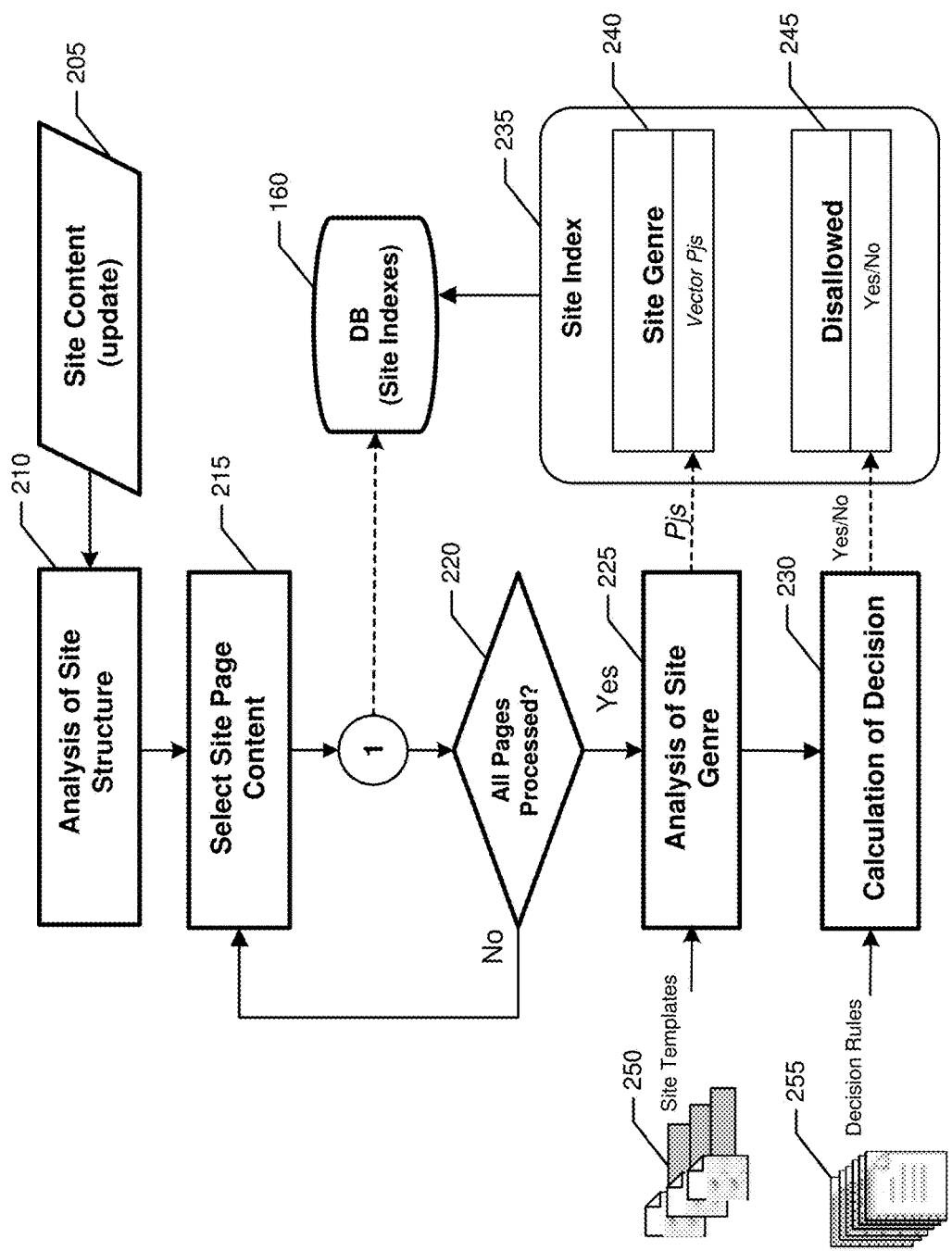
FIG. 2 illustrates a flow chart for automated processing and making a decision with regard to blocking a web site, in accordance with the exemplary embodiment.

FIG. 2 illustrates a flow chart for automated processing and making a decision with regard to blocking a web site, in accordance with the exemplary embodiment. A site content update is received in step 205. Analysis of the site structure is performed in step 210. The site page content is selected in step 215 and the page analysis depicted in FIG. 1 is performed for all pages, until all the pages are processed, in step 220. The database of the site indexes 160 is updated. If all pages are processed in step 220, the analysis of a site genre is performed in step 225 using site templates 250.

A vector of relevancy of the entire site content to the genres of the sites from the site genre rubricator is generated in step 225 and a site genre 240 is recorded in the site index 235. A decision for allowing or disallowing the web site is calculated in step 230 based on rules 255 and information contained in indices of all documents of the site. Then, a "disallowed" marker (yes/no) 245 is set in the site index 235, which is saved into the site index database 160. Thus, the site can be either allowed or blocked by a hosting provider.

Figure 3:
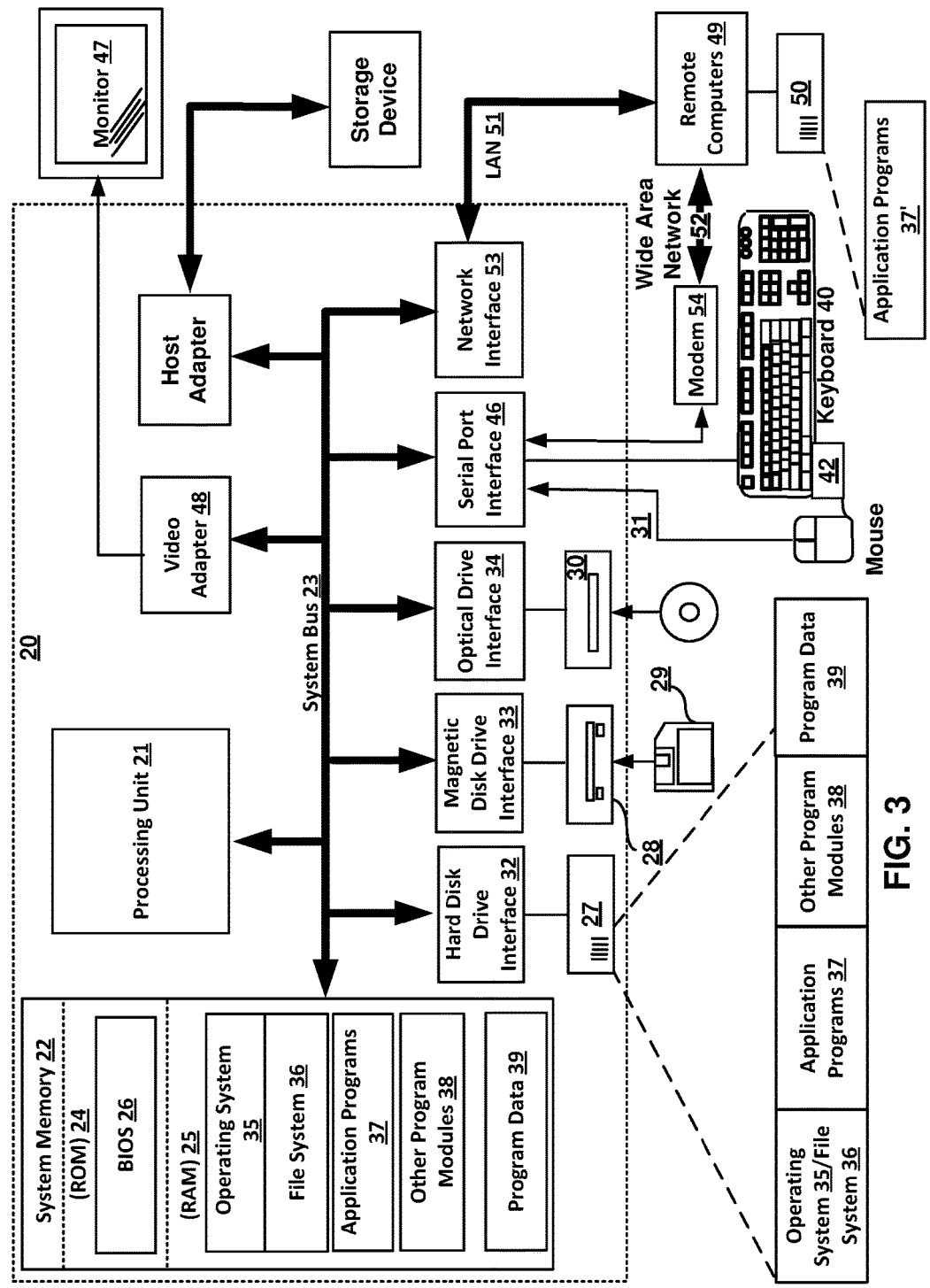
FIG. 3 illustrates a schematic of an exemplary computer system that can be used for implementation of the invention.

With reference to FIG. 3, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A computer-implemented method for automated analysis of web source content, the method comprising:
   analyzing a web site structure to identify web page documents of the web site;
   for the web page documents:

13 i. defining text fragments and their types based on content marking by content tags;
ii. deriving terms from a dictionary;
iii. finding the terms within the text fragments;
iv. determining a suspiciousness parameter value of the text by counting a number of terms with a lexical property "suspicious" in the text fragment, wherein the suspiciousness parameter is "true" if a predetermined number of terms with the "suspicious" lexical property is found in the text;
v. determining a genre of the web page document;
vi. defining thematic properties of the text of the web page document based on the thematic characteristics of terms found in the text;
vii. saving the genre and thematic properties of the text in a document index;
viii. finding "child" web page documents linked to the web page documents that have the "suspicious" status and assigning the "suspicious" status to the "child" web page documents;
ix. repeating analysis of the text of the web page document if the "suspicious" status is changed;
determining a genre of the web site based on the genres of the web page documents;
saving the site genre property into a site index;
calculating a document disallowance parameter based on rules for all of the web site documents with the "suspicious" status and saving the disallowance parameters into web site document indices;
assigning a "disallowed" status to the web page documents if its disallowance parameter exceeds a threshold;
saving the "disallowed" status to the web page documents into a web page index;
finding a document with a maximum value of the disallowance parameter in a web site index and saving the disallowance parameter as a site disallowance parameter;
assigning the "disallowed" status to the web site if its disallowance parameter exceeds a threshold; and
blocking the web site based on the "disallowed" status of the web site,
wherein the rules include the thematic properties of the texts of the web page documents, genre properties of the web page documents and a genre property of the web site.

2. The method of claim 1, wherein the lexical properties of the terms is a vector with Boolean values indicating whether the terms belong to any of the following groups of terms:
professional terms;
social group terms;
slang terms;
narcotics-related terms;
terrorism-related terms;
obscene language; and
suspicious terms.

3. The method of claim 1, wherein the web page document genre reflects a purpose and an activity provided by the web page.

4. The method of claim 1, further comprising accounting of the genre in an analyzing algorithm and forming a training set.

5. The method of claim 1, further comprising assigning the "disallowed" marker based on the vectors of relevancies of the text content of web documents to topics from the thematic rubricator, on the vectors of relevancies of the text

14 content of web documents to genres of documents from a genre rubricator, and on the vector of relevancy of the entire web site content to genres of the web site from the genre rubricator.

6. The method of claim 1, wherein the thematic properties of the text represents a vector of relevance of the text to a set of topics $t_i$ from a thematic rubricator, the vector of relevance defined as $\overline{P}_t = (p(t_1), p(t_2), \ldots, p(t_i), \ldots, p(t_{Nt}))$, where $p(t_i)$ is the relevance of the text to topic $t_i$, $i \in [1, \ldots, Nt]$, where Nt is a number of topics in the thematic rubricator.

7. The method of claim 6, wherein for each occurrence of a coincident implementation of a topic $t_i$, a genre $j_k$, a site genre $js_m$ and a lexical characteristic $lex_q$, a corresponding disallowing marker $m^-$ or allowing marker $m^+$ is assigned.

8. The method of claim 7, further calculating of probabilities of an "allowed" combination of a topic $t_i$, a genre $j_k$, a site genre $js_m$ and a lexical characteristic $lex_q$, and "disallowed" one, as follows:
$M^- = \Sigma p(t_i) \cdot p(j_k) \cdot p(js_m) \cdot lex_q$, such that topic $t_i$, a genre $j_k$, a site genre $js_m$ and a lexical characteristic $lex_q$ correspond to disallowing marker $m^-$; and
$M^+ = \Sigma p(t_i) \cdot p(j_k) \cdot p(js_m) \cdot lex_q$, such that topic $t_i$, a genre $j_k$, a site genre $js_m$ and a lexical characteristic $lex_q$ correspond to allowing marker $m^+$.

9. The method of claim 8, further comprising normalizing the probabilities so that a sum of all the probabilities is 1.

10. The method of claim 8, further comprising making a final decision about blocking or allowing the web document content based on a C criterion, wherein $$C = (M^- - M^+).$$

11. The method of claim 10, further comprising disallowing the web site content, if C>0 for at least one document.

12. The method of claim 1, wherein the web page document is any of:
a structured file containing text and images;
a structured text file;
an HTML/XML file;
a JSON file; and
a plain text file.

13. The method of claim 1, further comprising saving the suspiciousness parameter value into the web page document index as the web page document having a "suspicious" status.

14. The method of claim 1, wherein the determining of the genre of the web page document is based on comparing genre markers of the web page document to genre markers from the dictionary.

15. The method of claim 1, wherein the thematic properties of the text are calculated based on thematic characteristics of the terms in the text.

16. A non-transitory computer storage medium storing computer code for executing the steps of claim 1.

17. A system for automated analysis of web source content, the system comprising:
for web page documents of a website, computer program code for:
i. defining text fragments and their types based on content marking by content tags;
ii. deriving terms from a dictionary;
iii. finding the terms within the text fragments;
iv. determining a suspiciousness parameter value of the text by counting a number of terms with a lexical property "suspicious" in the text fragment, wherein the suspiciousness parameter is "true" if a predetermined number of terms with the "suspicious" lexical property is found in the text;

v. defining thematic properties of the text of the web page document based on the thematic characteristics of terms found in the text;

vi. saving genre and thematic properties of the text in a document index;

vii. assigning a "suspicious" status to any "child" web page documents;

viii. repeating analysis of the text of the web page document if the "suspicious" status is changed;

computer program code for a. determining a genre of the web site based on the genres of the web page documents;

b. saving the genre of the website into a site index;

c. calculating a document disallowance parameter based on rules for all of the web site documents with the "suspicious" status and saving the disallowance parameters into the web site document index;

d. assigning a "disallowed" status to the web page documents if its disallowance parameter exceeds a threshold;

e. saving the "disallowed" status of the web page documents into a web page index;

f. finding a document with a maximum value of the disallowance parameter in the web site index and saving the disallowance parameter as a site disallowance parameter;

g. assigning the "disallowed" status to the web site if its disallowance parameter exceeds a threshold; and h. blocking the web site based on the "disallowed" status of the web site, wherein the rules include the thematic properties of the texts of the web page documents, genre properties of the web page documents and a genre property of the web site.

* * * * *